United States Patent [19]
Blake

[11] 3,785,818
[45] Jan. 15, 1974

[54] METHOD OF MAKING LITHOGRAPHIC PRINTING PLATES

[75] Inventor: Ralph Kingsley Blake, Westfield, N.J.

[73] Assignee: E. I. du Pont de Nemours and Company, Wilmington, Del.

[22] Filed: Oct. 13, 1971

[21] Appl. No.: 189,030

Related U.S. Application Data

[63] Continuation-in-part of Ser. No. 847,399, Aug. 4, 1969, Pat. No. 3,635,710.

[52] U.S. Cl. .......................... 96/33, 96/29 L, 96/49
[51] Int. Cl. .......................... G03f 7/02
[58] Field of Search .......................... 96/33, 29 L, 49

[56] References Cited

UNITED STATES PATENTS 3,242,857 3/1966 Nadeau .......................... 96/33
3,309,990 3/1967 Klupfel et al. .......................... 96/33

*Primary Examiner*—Norman G. Torchin
*Assistant Examiner*—Richard L. Schilling
*Attorney*—William R. Moser

[57] ABSTRACT

A long lived gelatin lithographic printing plate is prepared by imagewise exposing an element bearing a silver halide emulsion layer having a stratum of hexacyanoferrate sol thereon to actinic radiation, developing in a conventional developer, and activating with a cupric ion solution to form a lithographic image which accepts ink in the exposed areas and water in the unexposed areas. Novel activating solutions for the silver halide are provided. The resulting printing plates are capable of yielding many thousands of impressions.

13 Claims, No Drawings

METHOD OF MAKING LITHOGRAPHIC PRINTING PLATES

CROSS REFERENCE TO RELATED APPLICATION

This application claims benefit of the filing date of copending U.S. Pat. application Ser. No. 847,399, filed Aug. 4, 1969 by Ralph Kingsley Blake, now U.S. Pat. No. 3,635,710, issued Jan. 18, 1972, of which this application is a continuation-in-part.

BACKGROUND OF INVENTION

This invention relates to lithographic printing and more particularly to the preparation of lithographic printing plates. Still more particularly it relates to preparing improved lithographic printing plates from gelatino-silver halide emulsion layers.

Preparing lithographic plates from gelatino-silver halide emulsion layers is well known. In one process an exposed gelatino-silver halide emulsion layer is developed with a tanning developer which converts the gelatin in the imaged areas to an oleophilic colloid. The developed gelatino-silver image may also be used to produce a lithographic plate. The silver image may be used to catalyze oxidative degradation of the gelatin in image areas, thus exposing an oleophilic underlayer.

According to the bromoil process the gelatino silver image is treated with a bleach which tans the gelatin in the imaged areas so that it becomes ink-receptive. In a process disclosed in Lassig et al., U.S. Pat. No. 3,083,097 a silver image devoid of associated silver halide, including a gelatino-silver image, may be converted to a lithographic image by a process comprising the sequential steps of treating said image with a bleach which converts the silver image to an image of heavy metal and/or silver compounds and then reacting these compounds with an alkaline solution of sparingly soluble organic compounds containing —SH, —SeH, —OH, or —NH groups to form compounds which are less soluble than the original products of oxidation and make the imaged areas of the plate oleophilic. The prior art processes use an ordinary silver or gelatino-silver image obtained by conventional photographic processes from a gelatino-silver halide photosensitive stratum. These processes have several disadvantages. They are of limited utility because the processes require much skill, are complex and slow, requiring fixing and washing steps, and the plates have a relatively short press life.

SUMMARY OF THE INVENTION

This invention comprises a method of making a lithographic printing plate from an element comprising a supported photosensitive gelatino-silver halide emulsion layer having in operative association with its surface a stratum of hexacyanoferrate sol. The method comprises the steps of exposing the element to actinic radiation, developing the exposed element with a conventional photographic developer, and treating the developed element with a cupric ion activator which converts the imaged element into a lithographic printing plate capable of many thousands of impressions. Optionally, a photographic developing agent may be incorporated in the emulsion.

The gelatino-silver halide emulsion layer comprises silver chloride, chlorobromide, bromide or iodobromide crystals dispersed in a gelatin binder coated on a support to a coating weight of at least 1 mg of silver halide per square decimeter. The amount of silver halide used is somewhat dependent on the results desired but at least 1 $mg/dm^2$ must be present to provide a lithographic image. There is no upper limit to useful coating weights but there is no advantage in using more than 100 $mg/dm^2$ of silver halide. Satisfactory results are obtained with coating weights of about 5 to 50 $mg/dm^2$ of silver halide. The emulsion may be panchromatically sensitized.

Preferably, the emulsion is overcoated with a thin antibrasion layer of gelatin or similar water-permeable proteinaceous colloid containing imidazole groups. The anti-abrasion layer may contain the hexacyanoferrate sol but preferably said sol is coated last over either the emulsion or the antiabrasion layer, if present. Suitable proteinaceous colloids that may be used in place of or in addition to gelatin include casein and zein.

The hexacyanoferrate sol comprises an aqueous dispersion of hexacyanoferrate (II) (ferrocyanide) or hexacyanoferrate (III) (ferricyanide) ions with a suitable heavy metal cation. Preferred cations are copper (II), nickel (II), cobalt (II), palladium (II), and rhodium (II). The hexacyanoferrate sol used in coating the gelatino-silver halide emulsion contains 0.005 to 0.1 moles of the hexacyanoferrate per liter. Coating adjuvants may be added to the sol and complexing agents, e.g., citrate, tartrate, or acetate ions, are useful in controlling the free cation concentration for optimum results.

The photosensitive element should have sufficient hardener added to the emulsion and/or antiabrasion layer and/or hexacyanoferrate sol so that no substantial amount of colloid is transferred on printing.

The film support for the emulsion layers used in the novel process may be a macromolecular organic polymer. For example, a cellulose derivative, e.g., cellulose acetate, cellulose triacetate, cellulose mixed esters, etc., may be used. Polymerized vinyl compounds, e.g., copolymerized vinyl acetate and vinyl chloride, polystyrene, and polymerized acrylates may also be mentioned. The film formed from the polyesterification product of a dicarboxylic acid and a dihydric alcohol made according to the teachings of Alles, U.S. Pat. No. 2,779,684, and the patents referred to in the specification of that patent, is suitable. Other hydrophobic films are the polyethylene terephthalate-isophthalates of British Pat. No. 766,290 and Canadian Pat. No. 562,672 and those obtainable by condensing terephthalic acid and dimethyl phthalate with propylene glycol, diethylene glycol, tetramethylene glycol or cyclohexane 1,4-dimethanol (hexahydro-p-xylene alcohol). The films of Bauer et al., U.S. Pat. No. 3,052,543 may also be used. The above polyester films are particularly suitable because of their dimensional stability. Paper, especially polyethylene coated paper, and metal may also be used as supports.

In practicing this invention the element is exposed to actinic radiation imagewise, developed to a silver image in a conventional silver halide latent image developer, then activated in a solution containing at least 0.01 mole of cupric ions per liter. The silver image may be completely converted to silver ion but preferably activation is continued until part but not all of the superficial developed silver is converted to silver ion, with equivalent fomation of cuprous ion. Preferably the activator contains a cupric halide which reconverts developed silver to silver halide.

After this treatment the exposed areas of the gelatin layers are oleaginous ink-receptive and the plate may be immediately placed on a printing press.

In another use of the element of this invention the photosensitive hexacyanoferrate coated element or a similar non-sensitive silver halide free coating of the hexacyanoferrate sol on or in a supported, suitably hardened, hydrophilic, water-permeable gelatin or proteinaceous coating containing imidazole groups may be used as the receptor element in a transfer process. In such a process a conventional silver image is activated in contact with said receptor element. An ink-receptive image is formed on the silver free receptor element and after separation the receptor element may be used as lighographic printing plate.

The element of this invention is well adapted to the preparation of lithographic plates directly from automatic photo-typesetting equipment. Contact or reflex exposures may also be made to prepare plates suitable for rapid, simple document duplication.

The activator solutions used in practicing this invention comprise copper (II) ion in a concentration of at least about 0.01 molar, preferably at least 0.03 molar, a halide ion capable of forming a silver salt that is at most as soluble as silver chloride which is added to provide a concentration of about 0.01 molar to about 0.5 molar, preferably 0.01 to 0.1 molar, and, optionally, iron (III) ion in a concentration such that the ratio of copper (II) ion concentration to iron (II) concentration is between about 1/5 and about 100/1 preferably between 1/3 and 30/1. The pH of the activator solution should be from about 0.5 to 6 and preferably between 1 and 3. The activator solution may also contain a complexing agent in a concentration of 0.01–1 molar.

The activator solution may contain other adjuvants which improve the quality of the lithographic plate. Cyanoguanidine, 1,2,3-triphenylguanidine, benzotriazole, and 9,10-phenanthroline are useful adjuvants which may be added to the activator solution. Activator solutions containing cyanoguanidine and 1,2,3-tripheynlguanidine give plates which start to print more rapidy on the press than solutions without them. Activator solutions containing benzotriazole, preferably in a concentration of 0.00084–0.084 molar, give improved plates having a longer press life. The rate of activation of the solution may be controlled by adding 9,10-phenanthroline which slows the activation reaction. A preferred activator solution contains 0.3 molar citric acid; 0.075 molar bromide ion; 0.075 molar copper (II) ion; 0.025 molar iron (III) ion; 0.00168 molar benzotriazole and has a pH of 2. Other suitable activator solutions are illustrated in the examples which follow.

EXAMPLE I

A nickel (II) hexacyanoferrate (II) sol prepared as follows:

Solution A
- 0.1M Potassium citrate — 10 ml
- 0.1M Nickel (II) nitrate — 5 ml

Solution B
- 0.1M Potassium hexacyanoferrate (II) — 15 ml
- Saponin (10 percent aqueous solution) — 1 ml
- Thymol (5 g/100 ml of ethanol) — 2 ml
- Water — 82 ml Solution A was added to Solution B in 15 seconds with rapid stirring at 75°F.

An ortho-sensitized gelatino-silver chlorobromide emulsion having a 70/30 mole percent bromide/chlorine ratio and containing 111 G of gelatin per mole of silver halide was coated at a coating weight of 88 mg/dm of silver halide on a subbed polyethylene terephthalate film base prepared as described in Example IV of Alles, U.S. Pat. No. 2,779,684. The dried emulsion was overcoated with a gelatin antiabrasion layer at a coating weight of 2.5 $mg/dm^2$ of gelatin hardened with 4.25 g of dimethylolurea per 100 g of gelatin. The element was then overcoated with the nickel (II) hexacyanoferrate (II) sol in red safelights at a speed of 8 feet per minute and a temperature of 75° F, then hot air dried.

A sample of the element was exposed through a halftone and line test negative for 6 seconds with a 500-watt RSP–2 reflector photospot lamp*(*Tungsten filament, placed at a distance of 50 inches.) operated at 15 volts The exposed sample was developed for 20 seconds at 72°F in a conventional high pH hydroquinone/-1-phenyl-3-pyrazolidone developer containing 0.25 g of benzotriaxole per liter, rinsed 5 seconds in water then activated without prior fixing for 30 seconds at 72°F in an aqueous bath of the following composition.

- 3 molar cupric nitrate solution — 50 ml
- 3 molar citric acid solution — 50 ml
- 3 molar potassium bromide solution — 5 ml
- 1 molar iron (III) nitrate solution — 15 ml
- Water to make — 1,000 ml The activated sample was rinsed 5 seconds, mounted on an offset office duplicating machine (A. B. Dick Co.) and rubbed with a fountain solution prepared as follows.

A fountain solution concentrate was prepared having the following composition:

- 3 molar aqueous orthophosphoric acid solution — 10 ml
- 0.5 molar aqueous trisodium phosphate solution — 25 ml
- Water to make — 1,000 ml The fountain solution was then prepared from the concentrate according to the following formula.

- Fountain solution concentrate — 20 ml
- Gum arabic solution (1 part by weight to 100 parts by volume of water) — 20 ml
- Diethylene glycol monobutyl ether — 50 ml
- Water to make — 1,000 ml The plate was then inked with lithographic ink and used to print 10,000 offset copies of white bond paper. The plate started to print rapidly and all prints were of good quality.

EXAMPLE II

A sample was prepared as in Example I using a cobalt (II) hexacyanoferrate (II) sol in place of the nickel (II) hexacyanoferrate (II) sol. The sol was prepared as in Example I using cobalt (II) nitrate in place of the nickel (II) nitrate. This sample, when exposed, activated, inked, and printed, as in Example I, gave good copies on bond paper.

EXAMPLE III

A sample was prepared as in Example I using a copper (II) hexacyanoferrate (II) sol (prepared as in Example I using copper (II) nitrate instead of nickel (II) nitrate) as an overcoat for the gelatino-silver halide layer. When the sample was exposed, activated, inked, and printed, as in Example I, negative offset copies were obtained.

EXAMPLE IV

A sample was prepared as in Example I using the following hexacyanoferrate sol instead of that of Example I.

Solution A
- Water — 75 ml
- Gum arabic (1 g/100 water) — 10 ml
- 0.1 molar aqueous nickel (II) nitrate hexahydrate — 5 ml
- Polyacrylic acid (5 ml/100 of water) — 10 ml Solution B
- Water — 70 ml
- Gum arabic (1 g/100 ml of water) — 10 ml
- 0.1 molar potassium hexacyanoferrate) (II)—10 ml
- Polyacrylic acid (5 ml/100 of water) — 10 ml Solution A was added to Solution B in 5 seconds with rapid stirring.

When exposed, activated, inked, and printed, as in Example I, negative offset copies were obtained.

EXAMPLE V

Example IV was repeated except that the activator solution had the following composition:
- 3 molar copper (II) nitrate trihydrate (aqueous) — 25 ml
- 3 molar potassium bromide (aqueous) — 50 ml
- 1 molar potassium acetate (aqueous) — 100 ml
- 1 molar ferric nitrate nonahydrate (aqueous) — 100 ml
- Water to make — 1,000 ml When inked and printed as in Example I, good negative offset copies were obtained devoid of scum in unexposed areas.

EXAMPLE VI

A nickel (II) hexacyanoferrate (III) sol was prepared by the procedure of Example IV using potassium hexacyanoferrate (III) in place of the potassium hexacyanoferrate (II). An element was prepared as in Example I. This element was exposed through a $\sqrt{2}$ step wedge to a No. 2 RFL photoflood operated at 35 volts at a distance of 2 feet. The exposed element was developed in a high pH 1-phenyl-3-pyrazolidinone hydroquinone developer containing 0.25 g of benzotriazole per liter, bathed in 2 percent acetic acid for 30 seconds, washed and dried. The sample was then bathed for 20 seconds in an activation solution of the following composition:
- 3 molar potassium bromide solution — 100 ml
- 3 molar copper (II) nitrate solution — 50 ml
- Water — 850 ml The sample was then rubbed with the fountain solution of Example I, then inked and printed. Good lithographic copies were obtained.

EXAMPLE VII

A sample was prepared as in Example VI using a nickel (II hexacyanoferrate (II) prepared as follows:

Solution A
- Water — 95 ml
- 0.1 molar nickel (II) nitrate hexahydrate (aqueous) — 5 ml Solution B
- Water 85 ml
- 0.1 molar potassium hexacyanoferrate (II) (aqueous) — 15 ml Solution A was added to Solution B with rapid stirring. The sample was exposed, developed and activated as in Example VI. When inked and printed, good copies resulted.

EXAMPLE VIII

A sample was prepared as in Example VII using an overcoat made from the following solution.

Solution A
- 0.1 molar potassium citrate (aqueous) — 10 ml
- 0.1 molar nickel (II) nitrate (aqueous) — 5 ml
- Water — 85 ml Solution B
- 0.1 molar potassium hexacyanoferrate (II) — 15 ml
- Saponin (10 percent solution in alcohol-water) — 1 ml
- Thymol (5 g/100 ml of alcohol) — 2 ml
- Water — 82 ml The sample was exposed for 3 seconds through a line and halftone test negative with a No. 2 RFL photoflood operated at 15 volts at a distance of 40 inches. The exposed sample was developed for 30 seconds in a high pH 1-phenyl-3-pyrazolidinone/hydroquinone developer, water washed for 10 seconds, and activated for one-half minute in an activator solution having the following composition.
- 3 molar copper (II) nitrate (aqueous) — 50 ml
- 3 molar citric acid (aqueous) — 50 ml
- 3 molar potassium bromide (aqueous) — 5 ml
- 1 molar iron (III) nitrate (aqueous) — 5 ml
- Water to make — 1,000 ml The sample was then washed and used to print 1,400 copies on an offset office duplicator. The fountain solution of Example I was used. Good offset copies were obtained.

EXAMPLE IX

A nickel (II) hexacyanoferrate (II) sol was prepared as follows:

Solution A
- 0.1 molar potassium citrate (aqueous) — 20 ml
- 0.1 molar nickel (II) nitrate (aqueous) — 10 ml
- Water — 170 ml Solution B
- 0.1 molar potassium hexacyanoferrate (II) — 30 ml
- Partial sodium salt of N-lauryl beta iminodipropionate (1 g/100 ml of alcohol) — 4 ml
- Water — 166 ml Solution A as added to Solution B in 15 seconds with rapid stirring.

A high speed, ortho-sensitized gelatino-silver iodobromide emulsion having about 1.2 percent silver iodide and containing about 120 g of gelatin per mole of silver halide, coated at a coating weight of about 25 mg/dm$^2$ on a smooth, polyethylene coated, photographic paper base was overcoated with the sol by skim coating at a speed of 8 feet per minute and hot air drying.

Samples were exposed through a line and halftone test negative with a 500 watt RSP–2 photospot lamp operated at 15 volts at a distance of 50 inches. Exposed samples were developed 20 seconds in the developer of Example I, rinsed 5 seconds in water, then activated for 20 seconds in an activator solution of the following composition:

3 molar potassium bromide (aqueous) — 15 ml
3 molar copper (II) nitrate (aqueous) — 25 ml
3 molar citric acid (aqueous) — 25 ml
1 molar iron (III) nitrate nonanydrate (aqueous)—25 ml
Triphenyl guanidine (1 g/100 ml of alcohol — 50 ml Water to make — 1,000 ml The activated plate was water rinsed 5 seconds, mounted on an offset office duplicating machine, rubbed with the fountain solution of Example I, and used to print more than 500 offset copies using the fountain solution of Example I.

EXAMPLE X

A nickel (II) hexacyanoferrate (II) sol was prepared as follows:

Solution A
- Water — 800 ml
- Nickel (II) nitrate hexahydrate — 0.75 g
- Potassium citrate monohydrate — 0.61 g Solution B
- Water — 190 ml
- Potassium hexacyanoferrate (II) trihydrate — 1.06 g
- Sodium octyl phenoxy ethoxy sulfonate (4.2% aqueous solution) — 10 ml Solution A was added rapidly to B with vigorous stirring.

Example IX was repeated using the above sol as the overcoat. An excellent lithographic plate was obtained capable of printing several thousand offset copies.

EXAMPLE XI

Example IX was repeated using an activating solution of the following composition:

Glacial acetic acid — 100 ml
Benzotriazole (1 g/100 ml of alcohol) — 100 ml
1 molar potassium citrate (aqueous) — 100 ml
3 molar potassium bromide (aqueous) — 50 ml
3 molar copper (II) nitrate trihydrate — 25 ml
1 molar iron (III) nitrate monohydrate — 25 ml
Triphenyl guanidine (1 g/100 ml of alcohol) — 50 ml Water to make — 1,000 ml A good lithographic plate was obtained which had a rapid start-up on the press without bakground scum.

EXAMPLE XII

Example VII was repeated except that the activator solution had the following composition:

3 molar copper (II) nitrate trihydrate (aqueous) — 12.5 ml
3 molar potassium bromide (aqueous) — 25 ml
1 molar potassium acetate (aqueous) — 100 ml
1 molar potassium citrate (aqueous) — 100 ml
1 molar iron (III) nitrate monohydrate (aqueous) — 100 ml
Water to make — 1,000 ml
Good lithographic ink copies were obtained.

EXAMPLE XIII

Example VII was repeated except that the activator solution had the following composition:

3 molar copper (II) nitrate (aqueous) — 50 ml
3 molar citric acid (aqueous — 50 ml
3 molar potassium bromide (aqueous) — 5 ml
1 molar iron (III) nitrate (aqueous) — 5 ml
Water to make — 1,000 ml
Good lithograhic ink copies were obtained.

EXAMPLE XIV

A nickel (II) hexacyanoferrate sol was prepared as follows:

Solution A
- Water — 665 ml
- 0.1 molar nickel (II) nitrate hexahydrate (aqueous) — 20 ml
- 0.1 molar potassium citrate monohydrate (aqueous) — 15 ml Solution B
- Water — 72 ml
- 0.1 molar potassium hexacyanoferrate (II) trihydrate — 20 ml
- Condensation product of coconut fatty acid and diethanol amine (1 g/100 ml of alcohol) — 8 ml Solution A was added to Solution B in 15 seconds with rapid stirring at 75°F.

A commercial stabilization enlarging paper having developer incorporated in the photosensitive emulsion was dipped into this sol, allowed to drain, and dried.

A sample was exposed through a negative line and halftone image transparency for 10 seconds using a K&M Tri Level Point Source lamp*(*100-watt tungsten filament point source lamp (General Electric Co. flash 100T8-15c-20v) operated at 8 volts.) operated at level 1 at a distance of 55 inches. The exposed sample was treated with a basic activator solution for 35 seconds, then treated for 10 seconds with the lithographic activator solution of Example IX. The processed sample was swabbed with the fountain solution of Example I, inked, and used to print good lithographic copies.

EXAMPLE XV

The emulsion of Example IX was coated to a coating weight of about 25 mg/dm$^2$ on a smooth, polyethylene coated, photographic paper base and dried. The emulsion layer was overcoated as in Example XIV with the nickel (II) hexacyanoferrate sol of Example X to which 40 grams per liter of hydroquinone and 5 grams per liter of sodium sulfite were added. The sample was exposed as in Example XIV except that a 3 second exposure was used. The exposed sample was processed as in example XIV and good lithographic copies were obtained.

EXAMPLE XVI

A direct positive fogged silver chloride emulsion made according to the teachings of Burt, U.S. Pat. No. 3,445,235, was coated to a weight of 57 mg of silver halide per square decimeter on a polyethylene terephthalate support made according to Example IV of Alles, U.S. Pat. No. 2,779,684, and dried. The emulsion was then overcoated in red safelights with the nickel (II) hexacyanoferrate (II) sol of Example V at 9 feet per minute and 100°F, then hot air dried.

A sample was exposed for 20 seconds through a positive line and halftone image transparency to a 500-watt RFL photoflood lamp operated at 110 volts at a distance of 2 feet. The exposed sample was developed 30 sec. in the developer of Example I, rinsed in water for 5 sec. and activated for 20 sec. in the activator solution of Example IX. After treatment with the fountain solution of Example I the plate was used to print good positive lithographic ink copies.

EXAMPLE XVII

A sample of the element of Example XVI was exposed through a positive line and halftone image transparency to a 500-watt RFL photoflood lamp operated at 110 volts at a distance of 2 feet for 20 seconds. The sample was then developed 30 seconds at 73°F in a high pH 1-phenyl-3-pyrazolidone/hydroquinone developer containing 0.25 g/l of benzotriazole and 0.5 g/l of 1-cyanoguanidine. The developed sample was activated for 8 seconds at 73°F in an activator solution prepared as follows.

Solution A and B were prepared.

Solution A

- 3 molar copper (II) nitrate trihydrate (aqueous) — 25 ml
- 3 molar potassium bromide (queous) — 15 ml
- 3 molar citric acid (aqueous) — 25 ml
- 1 molar iron (II) nitrate (aqueous) — 10 ml
- Water to make — 900 ml Solution B

- 1,10-phenanthroline (1 g/100 ml of alcohol) — 50 ml
- 1,2-bis(2-chloroethoxy) ethanol — 10 ml The activator solution had the following formula.

Solution A — 900 ml
Solution B — 60 ml
Water to make — 1,000 ml

The activated plate was squeegeed dry, placed on an office duplicating machine, swabbed with the fountain solution of Example I and used to print several hundred ink copies. A good positive lithographic image was obtained.

EXAMPLE XVIII

A high-speed, ortho-sensitized gelatino silver iodobromide emulsion having 1.2 mole percent silver iodide and a gelatin to silver halide ratio of 0.36 was coated at a coating weight of 7.2 milligrams of silver bromide per square decimeter on a polyethylene terephthalate photographic film base. The emulsion was overcoated with an antiabrasion layer comprising 10 milligrams per square decimeter of gelatin hardened with 2.96 g of formaldehyde and 11.25 g of dimethylolurea per 100 g of gelatin. The element was then overcoated with the nickel (II) hexacyanoferrate (II) sol of Example X by skim coating at 100°F and 9 feet per minute, and hot air dried.

A sample was exposed through a step wedge and line image transparency for 10 seconds with a K&M Tri Level Point Source lamp*(*Same as in Example XIV, operated at 16 volts.) operated at level 2 at a distance of 50 inches using an ultra-violet filter and a neutral density filter of 0.6 optical density. The exposed sample was developed 30 seconds in the developer of Example I and activated for 8 seconds in an activator solution having the following composition.

3 molar copper (II) nitrate trihydrate — 25 ml
3 molar potassium bromide — 15 ml
3 molar citric acid — 25 ml
1 molar iron (III) nitrate monohydrate — 10 ml
Water to make — 1,000 ml The plate was then rubbed with a 1 percent aqueous dispersion of colloidal silica and used on an office duplicator to print offset copies using the ink and fountain solution of Example I.

EXAMPLE XIX

A sample of the coated emulsion of Example XV was overcoated by bathing in a palladium (II) hexacyanoferrate (II) sol prepared as follows, then drying.

Solution A

- Water — 665 ml
- 0.1 molar palladium (II) chloride (aqueous) — 20 ml
- 0.1 molar potassium citrate (aqueous) — 15 ml Solution B

- Water — 72 ml
- 0.1 molar potassium hexacyanoferrate (II) — 20 ml
- Condensation product of coconut fatty acid and diethanol amine (1 gram per 100 ml of alcohol) — 8 ml Solution A was added rapidly to Solution B at 75°F with rapid stirring.

The sample was exposed through a step wedge to a 0.0001 sec. flash from an Edgerton, Germeshausen, and Grier Mark VI exposure unit. The exposed sample was developed for 30 seconds in the developer of Example I, water washed for 5 seconds, and activated for 15 seconds in an activator solution of the following composition.

3 molar copper (II) nitrate (aqueous) — 25ml
3 molar potassium bromide (aqueous) — 15ml
3 molar citric acid (aqueous) — 25ml
Water to make — 1,000ml The activated sample was swabbed with the fountain solution of Example I and then with lithographic ink. Good lithographic copies were obtained.

EXAMPLE XX

Example XIX was repeated except that rhodium (II) chloride was used in place of palladium chloride. Good lithographic copies were obtained.

EXAMPLE XXI

An element prepared as in Example X was exposed on a phototypesetting machine having a cathode ray tube readout operated under the condition ordinarily used for exposing phototypesetting film. The exposed sample was developed for 30 seconds in a suitable developing machine filled with the developer of Example I and activated for 8 seconds in a suitable processing machine filled with the activator of Example IX. The sample was then placed on the office duplicating machine of Example I, swabbed with the fountain solution of Example I, inked with lithographic ink and used to print several thousand offset copies of good quality on white bond paper.

After treating with activator solution the element is preferably treated with an aqueous pre-wet solution containing at least 0.5 percent, by weight, of diethylene glycol monobutyl ether. The fountain solution of the printing press may be used as the pre-wet solution, as shown in the above examples, or a separate solution especially for this purpose may be employed.

The embodiments of the invention in which an exclusive property or privilege is claimed are defined as follows:

1. A method of making a lighographic printing plate comprising a. exposing imagewise to actinic radiation a photographic element comprising a support bearing a gelatino-silver halide emulsion layer and in operative association with the surface of said layer a stratum of a hexacyanoferrate comprising a heavy metal hexacyanoferrate (II) or hexacyanoferrate (III), b. developing the latent silver halide image in the emulsion layer, and c. treating the developed layer with an aque-ous activator solution containing cupric ions to con-vert the developed silver image to silver ions, whereby the exposed areas of the gelatin layer are receptive to an oleaginous printing ink.

2. A method according to claim 1 wherein said heavy metal is selected from the group consisting of copper (II), nickel (II), cobalt (II), palladium (II), and rhodium (II).

3. A method according to claim 1 wherein said stratum is in or on the surface of said emulsion layer.

4. A method according to claim 1 wherein said hexacyanoferrate is a nickel (II), hexacyanoferrate (II) or (III).

5. A method according to claim 1 wherein the silver halide emulsion is an orthochromatic gelatino-silver halide emulsion.

6. A method according to claim 1 wherein said aqueous activator solution has a pH about 0.5 – 6.0 and contains copper (II) ion in a concentration of at least 0.01 molar, and b. a halide ion capable of forming a silver salt which is at most as soluble as silver chloride in a concentration of about 0.01 – 0.5 molar.

7. A method according to claim 6 wherein said aqueous activator solution has a pH between 1 and 3.

8. A method according to Claim 6 wherein said aqueous activator solution contains a complexing agent in a concentration of 0.01–1 molar and benzotriazole in a concentration of 0.00084 – 0.084 molar.

9. A method according to claim 6 comprising the ad-di-tional step, after treating with said aqueous activator solution, of treating said emulsion layer with an aqueous pre-wet solution containing at least 0.5 percent, by weight, of diethylene glycol monobutyl ether.

10. A method according to claim 6 wherein said aqueous activator solution contains iron (III) ion in a concentration such that the ratio of copper (II) to iron (III) concentration is between about 1 to 5 and 100 to 1.

11. A method according to claim 9 wherein said aqueous activator solution has a pH between 1 and 3 and contains copper (II) ion in a concentration of at least 0.01 molar, a halide ion capable of forming a silver salt which is at most as soluble as silver chloride in a concentration of about 0.01 – 0.5 molar, a complexing agent in a concentration of 0.01 – 1 molar, benzotriazole in a concentration of 0.00084 – 0.084 molar, and iron (III) ion in a concentration such that the ratio of copper (II) to iron (III) concentration is between about 1 to 5 and 100 to 1.

12. A method according to claim 11 wherein said gelatino-silver halide emulsion layer contains silver iodobromide and said stratum of hexacynoferrate contains nickel (II) hexacyanoferrate (II).

13. A method according to claim 12 wherein said aqueous activator solution contains 0.3 molar citric acid; 0.075 molar bromide ion; 0.075 molar copper (II) ion; 0.025 molar iron (III) ion; 0.00168 molar benzotriazole and has a pH of 2.

* * * * *